Nov. 7, 1950
E. V. ERIKSSON
2,529,143
TOOL FOR BORING AND COUNTERSINKING WOOD
Filed Jan. 12, 1945
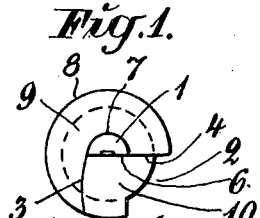
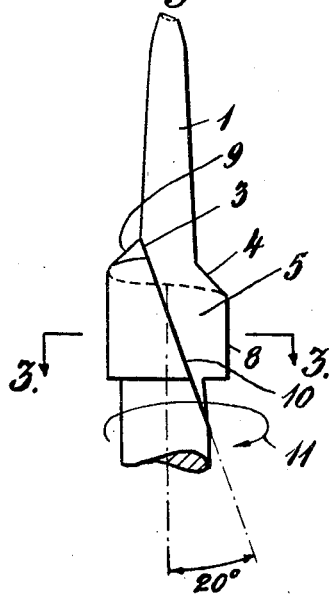
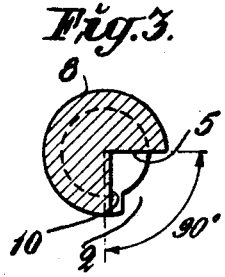
Erik V. Eriksson
by: Henry C. Parker
His attorney Patented Nov. 7, 1950

2,529,143

UNITED STATES PATENT OFFICE 2,529,143

TOOL FOR BORING AND COUNTERSINKING WOOD

Erik Viktor Eriksson, Stockholm, Sweden, assignor to Marcus & Co., Aktiebolag, Stockholm, Sweden Application January 12, 1945, Serial No. 572,476
In Sweden October 14, 1941

1 Claim. (Cl. 145—123)

The present invention relates to a tool for boring and countersinking wood which has a bore point or bit and a countersinking body, the latter consisting of a cylindrical portion and a tapering portion converging towards the base of the bit and carrying a cutting edge.

The present invention has for its object to produce a boring tool provided with a countersinking portion and having the property of producing countersunk holes having smooth edges.

The invention consists substantially in a boring tool for boring and countersinking wood which comprises a cutting bit of semicircular cross section having a planar longitudinal face, a shank, and an intermediate cylindrical countersinking body having a diameter larger than that of said bit and of said shank, said countersinking body having at its bit end a helical surface making an acute angle with the axis of the tool, a single longitudinal groove formed in said countersinking body extending throughout the length thereof and being defined by a leading planar wall and a trailing planar wall, the said leading planar wall having a backward pitch, forming an acute angle with the axis of the tool and forming a cutting edge at its intersection with said helical surface, the said trailing planar wall forming an extension of the planar face of the cutting bit, including the axis of the bit, forming an angle of at least about 90° with said leading wall, as measured in a plane perpendicular to the axis of the tool, and forming a trailing edge at its intersection with said helical surface.

According to the invention a longitudinal groove is provided in the countersinking body which forms preferably such an angle to the tool axis that the groove in its entirety has a backward pitch with respect to the cutting edge, that is, the leading wall of said groove slopes so that its cutting edge trails its base.

My invention can be explained with greater accuracy by reference to the accompanying drawing which shows a preferred embodiment thereof. In this showing—

Fig. 1 is a plan or top view of my tool,

Fig. 2 is a side elevation of the tool, while

Fig. 3 is a transverse sectional view taken along the line 3—3 of Fig. 2.

In the embodiment shown in Figs. 1 to 3 the cutting bit 1 is made with a cross section in the shape of a circular segment, in this particular case a semicircular segment, as shown in Fig. 1. The groove 2 is formed between the cutting edge 3 and the trailing edge 4. The wall 5, which forms the trailing edge 4, is planar and the tool axis falls within that plane. The chord or diameter 6 respectively of said semicircular segment faces the groove 2 whereas the arc 7 of the segment faces that part of the countersink 8 which is devoid of any groove. The operative part of the countersink consists of a helical surface 9 and the line of intersection between this surface and a plane 10 forming the second wall of the groove 2 constitutes the cutting edge 3. Although the wall 10 thus is planar the cutting edge 3 will be curved due to the curved shape of the helical surface and the fact that the plane of the wall 10 forms an acute angle, such as 20 degrees, to the axis of the tool. The bit has, according to Figs. 2 and 3, a planar lateral surface which coincides with the plane of the wall 5, i. e. in Fig. 2 with the plane of the drawing. The planes of the walls 5 and 10 are perpendicular to one another as shown in Fig. 3.

In Figs. 1 and 2 there is shown a plane lateral surface of the bit. Particularly in tools of larger sizes it may, however, be preferred to make the corresponding surface slightly concave which concavity preferably extends a distance into and over the wall 5.

In boring the direction of rotation is that indicated by the arrow 11. Both the cutting edge 3 and the groove 2 have in their entirety a backward pitch by which expression is understood that the more one approaches the base portion of the bit 1 the more the corresponding part of the edge and the groove respectively falls behind, as counted in the direction of rotation. It is known that this results in the advantage that the fibers of the wood are compressed in the same direction as the feeding of the bore into the wood. On the other hand, the obliquity of the plane of the wall 10 in relation to the axis of the bore results in that the cutting edge 3 according to Fig. 1 forms an acute angle with the outside of the countersink whereby the edge will be sharper.

What is claimed is:

A boring tool for boring and countersinking wood which comprises a cutting bit of semicircular cross section having a planar longitudinal face, a shank, and an intermediate cylindrical countersinking body having a diameter larger than that of said bit and of said shank, said countersinking body having at its bit end a helical surface making an acute angle with the axis of the tool, a single longitudinal groove formed in said countersinking body extending throughout the length thereof and being defined by a leading planar wall and a trailing planar wall, the said leading planar wall having a backward pitch, forming an acute angle with the axis of the tool and forming a cutting edge at its intersection with said helical surface, the said trailing planar wall forming an extension of the planar face of the cutting bit, including the axis of the bit, forming an angle of about 90° with said leading wall, as measured in a plane perpendicular to the axis of the tool, and forming a trailing edge at its intersection with said helical surface.

ERIK VIKTOR ERIKSSON.

REFERENCES CITED

The following references are of record in the file of this patent:

UNITED STATES PATENTS

| Number | Name | Date |
|---|---|---|
| 252,704 | Southwick | Jan. 24, 1882 |
| 303,053 | Russell | Aug. 5, 1884 |
| 1,070,425 | Darling | Aug. 19, 1913 |
| 1,235,604 | Royle | Aug. 7, 1917 |
| 1,263,698 | Paternostro | Apr. 23, 1918 |
| 2,334,845 | Schwartz | Nov. 23, 1943 |
| 2,362,260 | Foster | Nov. 7, 1944 |